United States Patent [19]

Kobayashi et al.

[11] 4,029,973
[45] June 14, 1977

[54] VOLTAGE BOOSTER CIRCUIT USING LEVEL SHIFTER COMPOSED OF TWO COMPLEMENTARY MIS CIRCUITS

[75] Inventors: Isamu Kobayashi, Tokyo; Osamu Yamashiro; Naoki Yashiki, both of Kodaira; Tadashi Funakubo, Higashiyamato, all of Japan

[73] Assignee: Hitachi, Ltd., Japan

[22] Filed: Apr. 6, 1976

[21] Appl. No.: 674,084

[30] Foreign Application Priority Data

Apr. 21, 1975 Japan .............................. 50-47546

[52] U.S. Cl. ................ 307/264; 58/23 A; 307/246; 307/247 R; 307/279; 307/DIG. 1; 307/DIG. 4
[51] Int. Cl.² .................. H03K 1/14; H03K 3/353; H03K 17/60; G04C 3/00
[58] Field of Search ............... 307/208, 246, 247 R, 307/251, 279, 288, 264, 268, DIG. 1, DIG. 4; 58/23 A, 23 BA, 50 R; 328/176

[56] References Cited

UNITED STATES PATENTS

| | | |
|---|---|---|
| 2,907,895 | 10/1959 | Van Overbeek .................. 307/288 |
| 3,521,141 | 7/1970 | Walton .......................... 307/251 X |
| 3,916,430 | 10/1975 | Heuner et al. ............ 307/DIG. 1 X |

OTHER PUBLICATIONS

B548,302, Feb. 1976, Stafford et al., 307/251.
Froemke, "Insulated Gate Field Effect Transistor", *IBM Tech. Discl. Bull.;* vol. 9, No. 9, pp. 1234–1235; 2/1967.

*Primary Examiner*—John S. Heyman
*Assistant Examiner*—Larry N. Anagnos
*Attorney, Agent, or Firm*—Craig & Antonelli

[57] ABSTRACT

This specification discloses an improvement for a voltage booster circuit. The improvement lies mainly in the use of MISFETs as switching means in a level converting circuit constructed in a complementary MIS semiconductor integrated circuit and therefore the voltage loss due to the conventional switching means can be prevented.

5 Claims, 3 Drawing Figures

VOLTAGE BOOSTER CIRCUIT USING LEVEL SHIFTER COMPOSED OF TWO COMPLEMENTARY MIS CIRCUITS

FIELD OF THE INVENTION

This invention relates to a booster circuit and more particularly to a booster circuit in integrated configuration, adapted for use in an electronic wrist watch.

DESCRIPTION OF THE PRIOR ART

Figure 1:
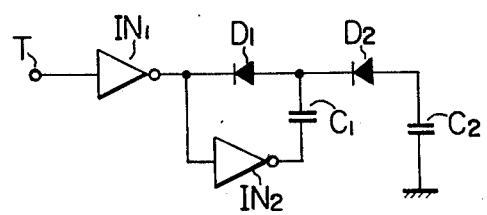
FIG. 1 is a circuit of a conventional voltage booster.

A conventional circuit used in an electronic wrist watch and fed by an electric cell is a complementary logic circuit consisting of insulated-gate field effect transistors (hereafter referred to as MISFETs) since they consume small electric power. As regards the complementary logic circuits in which the logic part and the display part are energized by separate power sources, two types are known; in one two discrete power sources are used and in the other the voltage of the power source for the logic part is boosted by a booster circuit so that the boosted voltage may be used as a power source for the display part. In an electronic wrist watch, the latter type is preferable in view of handling etc. As such a booster circuit there is the booster circuit shown in FIG. 1, which comprises diodes $D_1$ and $D_2$, capacitors $C_1$ and $C_2$ and inverters $IN_1$ and $IN_2$ and which is driven by a pulse signal applied to the inverter $IN_1$ from a pulse signal source T. In this booster circuit, however, the potential at the anode of a diode (p side) is lower than that at the cathode of the diode (n side) by its forward voltage drop $V_F$. Accordingly, the output voltage of the booster includes the voltage drops due to the diodes. Namely, this type of circuit has a drawback that if it consists of n stages, each stage having a diode and the diode having a forward voltage drop $V_F$, then the output at the last stage of the circuit equals $nV - nV_F$, where $V_{IN}$ is the input circuit. It is also preferable to construct in an integrated configuration a booster circuit for use in an electronic wrist watch, whose mounting space is necessarily limited.

SUMMARY OF THE INVENTION

One object of this invention, which has been made to solve the above problems, is to provide a booster circuit which is free from the voltage loss due to its switching means.

Another object of this invention is to provide a booster which can be constructed in a complementary MIS semiconductor integrated circuit.

According to this invention, therefore, there is provided an improvement in the booster circuit wherein a capacitor is connected via a switching means at least between the terminal for receiving a fixed voltage and the terminal for receiving a pulse input, the sum of the fixed voltage and the voltage of the pulse input is applied to one of the electrodes of the capacitor, and a voltage which is synthesized by the above summed voltage and the voltage of the pulse input.

The improvement consists essentially of using MISFETs each having an output terminal which is formed by short-circuiting the source to the substrate; using a level converting circuit wherein the gate electrode of the MISFET located on the side of the power source, in each one of the two complementary inversion circuits, is connected with the output terminal of the other complementary inversion circuit, a pulse signal is applied to the gate electrode of the MISFET located on the side of reference potential, in the one of the two complementary inversion circuit while the inversion of the pulse signal is applied to the gate electrode of the MISFET located on the side of reference potential, in the other complementary inversion circuit, and in each of the inversion circuits the channel conductivity of the MISFET on the side of the power source is much smaller than that of the MISFET on the side of the reference potential; and controlling the switching MISFETs in such a manner that pulse voltages are successively applied to the capacitors.

The improvement of this invention is particularly advantageous in that there is no level loss caused due to the switching means and that the use of MISFETs facilitates the incorporation of the booster in the semiconductor integrated circuit.

DETAILED DESCRIPTION OF THE EMBODIMENTS

Figure 2:
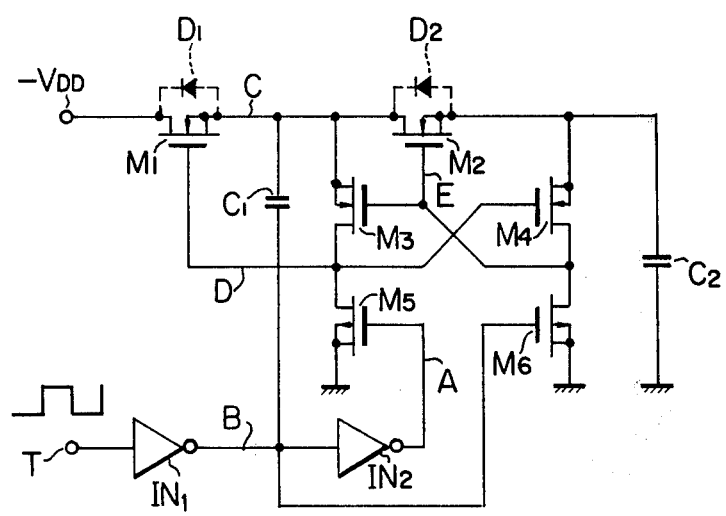
FIG. 2 is a circuit of a voltage booster embodying this invention.

FIG. 2 is a circuit of a booster as an embodiment of this invention. As shown in FIG. 2, according to this invention, n-channel MISFETs $M_1$ and $M_2$ with their sources short-circuited to the substrate and used as output terminals serve as switching means in the conventional booster circuit. In order to alternately switch the MISFETs $M_1$ and $M_2$ in response to an input pulse signal T, the output of a pulse level converting circuit which will be described later is utilized.

The pulse level converting circuit comprises a pair of complementary circuits, each consisting of an n-channel MISFET $M_3(M_4)$ and a p-channel MISFET $M_5(M_6)$ in cascade connections. The output of the complementary circuit $M_4$ and $M_6$ ($M_3$ and $M_5$) is applied to the gate of the MISFET $M_3$ ($M_4$), the input pulse signal T is applied through inverter circuits $IN_1$ and $IN_2$ to the gate of MISFET $M_5$, and the inversion pulse signal $\overline{T}$ of the input pulse signal T is applied through the inverter circuit $IN_1$ to the gate of MISFET $M_6$. The conductivity $\beta_n$ of the channels of the n-channel MISFETs $M_3$ and $M_4$ and the conductivity $\beta_p$ of the channels of the p-channel MISFETs $M_5$ and $M_6$ are so designed that the following formula (1) may be satisfied.

$$\beta_n \ll \beta_p \qquad (1)$$

In this voltage booster circuit, the boosted voltage available at the source of the switching MISFET $M_1$ is used as a voltage source for the complementary circuit ($M_3$, $M_5$) to control the switching MISFET $M_1$ of the first stage while the output voltage (not shown) of this booster circuit is used as a voltage source for the complementary circuit ($M_4$, $M_6$) to control the switching MISFET $M_2$ of the second stage. In this invention, a fixed voltage $-V_{DD}$ is supplied for the input terminal of the switching MISFET $M_1$ of the first stage and the level of the input pulse signal T periodically and alternately assumes the values $-V_{DD}$ and O.

This invention will now be described in detail with the aid of the waveforms shown in FIG. 3.

Under the initial condition where no charges are stored in the capacitors $C_1$ and $C_2$, the voltages at the sources of the switching MISFETs $M_1$ and $M_2$ are both zero so that the outputs of the level converting circuit, i.e. the voltages at the gates of the switching MISFETs $M_1$ and $M_2$, are zero. Accordingly, the MISFETs $M_1$ and $M_2$ are cut off. However, since the sources of the MISFETs $M_1$ and $M_2$ are connected with the substrate as described above, parasitic diodes as indicated by a broken line in FIG. 2 are formed between the sources and drains of the MISFETs $M_1$ and $M_2$. Consequently, even when the level B of the input pulse signal T is zero, the capacitor $C_1$ is charged through the parasitic diode $D_1$. As a result, a voltage $-|V_{DD} - V_F|$ is applied to the source of the MISFET $M_1$. Since the voltage at the gate of the MISFET $M_1$ is now OV, it is turned on to charge the capacitor $C_1$ up to a voltage equal to the fixed voltage $-V_{DD}$. In like manner, due to the potential C appearing at the source of the MISFET $M_1$, the capacitor $C_2$ is charged through the parasitic diode $D_2$ up to the source voltage of the MISFET so that the voltage developed across the capacitor $C_2$ causes the n-channel MISFET $M_2$ to turn on through the p-channel MISFET $M_6$ when the level B of the input pulse signal T is $-V_{DD}$.

The on-off operations of the MISFETs $M_1$ and $M_2$ will now be described in terms of signals A and B based on the input pulse signal T and the outputs D and E of the level converting circuits. It is to be noted that $-V_{DD}$ is $-1.5$ V in FIG. 3.

Figure 3:
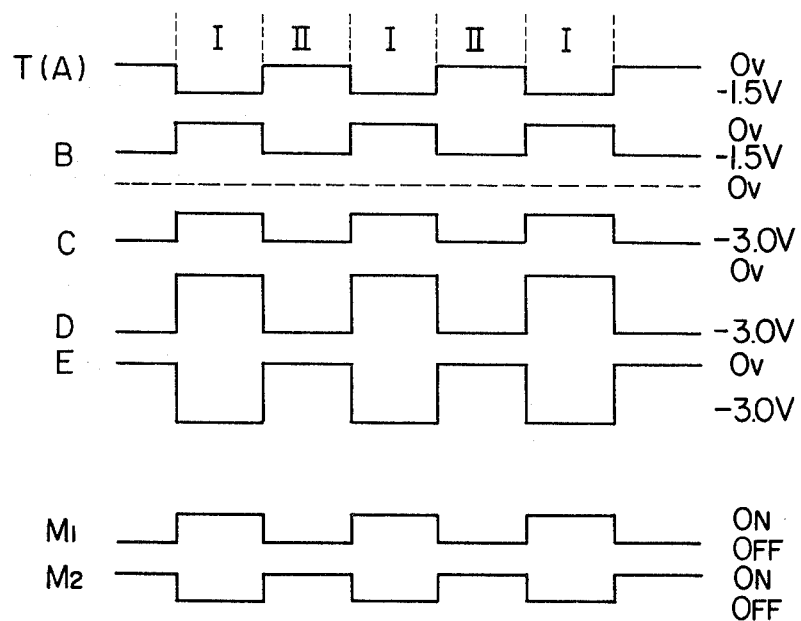
FIG. 3 shows waveform useful for illustrating the operation of the circuit shown in FIG. 2.

As seen from part (I) of FIG. 3, when the input pulse signal T is of low level $(-V_{DD})$, the signal B is of high level (OV) and the signal A is of low level $(-V_{DD})$. Accordingly, the output D assumes the high level since the n-channel MISFET $M_3$ is cut off while the p-channel MISFET $M_5$ whose source is grounded is turned on. On the other hand, the output E becomes twice the low level $(-2 V_{DD})$ since the n-channel MISFET $M_4$ is turned on and the p-channel MISFET $M_6$ is cut off, that is, the source voltage $(-V_{DD})$ is superposed upon the low level of the input pulse signal T. Accordingly, the n-channel MISFET $M_1$ is turned on to charge the capacitor $C_1$ up to $-V_{DD}$. The n-channel MISFET $M_2$ is cut off since the n-channel MISFET $M_4$ is conducting, that is, its gate and source are short-circuited and assume the same potential.

When the level of the input pulse signal T is high (OV), as seen from part (II) of FIG. 2 the signal B assumes the low level $(-V_{DD})$ and the signal A the high level (OV). Accordingly, the MISFET $M_3$ is turned on and the MISFET $M_5$ is cut off, so that the level of the signal D becomes the voltage $(-V_{DD})$ across the capacitor $C_1$ plus the level (OV) of the input pulse signal T and the signal D is applied through the MISFET $M_3$ to the gate of the MISFET $M_1$ to turn the MISFET $M_1$ off. On the other hand, since the MISFET $M_4$ is cut off and the MISFET $M_6$ whose source is grounded is conducting, then the output E is of high level so that the MISFET $M_2$ is turned on. Consequently, the capacitor $C_2$ is charged up to $-2V_{DD}$, i.e. the voltage across the capacitor $C_1$ plus the fixed voltage $-V_{DD}$. Thus, the voltage equal to twice the input voltage is developed across the capacitor $C_2$.

Next, the operation of the level converting circuit will be described. When the signal A is of high level and when the signal B assumes the low level, the p-channel MISFET $M_6$ is turned on while the p-channel MISFET $M_5$ is cut off. Consequently, the n-channel MISFET $M_3$ is turned on and the n-channel MISFET $M_4$ is cut off, so that the outputs D and E become $-V_{DD}$ and O, respectively. When the pulse input is inverted, the MISFETs $M_5$ and $M_6$ are respectively turned on and off. Then, the output D, which is determined by the ratio of the impedances of the MISFETs $M_3$ and $M_5$, assumes the high level, as seen from the formula (1) given before, to turn the MISFET $M_4$ on and to restore the output E to $-V_{DD}$ so that the MISFET $M_3$ is changed over to its cut-off state. In this way, the outputs D and E can be increased up to the level of the voltage source in response to the input pulses A and B.

As described above, according to this invention, since a MISFET with its source shortcircuited to the substrate is used as a switching means, an output equal to the input voltage can be obtained. Namely, such a voltage loss as caused by the diode used in the conventional booster circuit is not caused. Moreover, the present booster circuit is constituted of MISFETs and therefore can be easily integrated so that when it is applied as a voltage booster to an electronic wrist watch, it contributes much to the reduction of the size and cost of the watch.

This invention is not to be construed as limited to the described embodiment. For example, the roles of the p- and n-channel MISFETs may be interchanged and in that case it is only necessary to invert the polarity of the voltage of the power source.

We claim:
1. A voltage booster circuit comprising:
 a. a terminal for receiving a fixed voltage;
 b. a first switching MISFET having source, drain, gate and substrate electrodes, said drain electrode being connected to said terminal for receiving said fixed voltage;
 c. a second switching MISFET connected in series with said first switching MISFET and having source, drain, gate and substrate electrode;
 the substrate electrode of each of said first MISFET and said second MISFET being connected to the source electrode of the same respective MISFET, the source electrode of said first MISFET and the drain electrode of said second MISFET being connected to each other, said first MISFET and second MISFET being respective switching means of first and second stages;
 d. a pulse input terminal;
 e. a first inverter circuit and a second inverter circuit connected in cascade with said pulse input terminal;
 f. a first capacitor connected between a common connection of said first and second MISFETs and a common connection of said first and second inverter circuits;
 g. a second capacitor having one electrode connected with the source electrode of said second MISFET and the other electrode being grounded; and
 h. a level converting circuit having a first and a second complementary circuit, said first complementary circuit consisting of
 a third MISFET and a fourth MISFET connected in series with each other, and each having source, drain, gate and substrate electrodes, their substrate electrodes being respectively connected to their source electrodes, and both their drain electrodes being interconnected at a first junction point from which an output of the first complementary circuit is derived, said second complementary circuit consisting of
a fifth MISFET and a sixth MISFET connected in series with each other, and each having source, drain, gate and substrate electrodes, their substrate electrodes being respectively connected to their source electrodes, both their drain electrodes being interconnected at a second junction point from which an output of the second complementary circuit is derived,
said first junction point being connected to gate electrode of said first MISFET and connected to the gate electrode of said fifth MISFET,
said second junction point being connected to the gate electrode of said third MISFET and to the gate electrode of said second MISFET,
the source electrode of said third MISFET being connected to the common connection of said first and second MISFETs,
the source electrode of said fifth MISFET being connected to a common connection of the source electrode of said second MISFET and said one electrode of said second capacitor from which an output of said booster circuit is derived, and the source electrode of each of said fourth MISFET and sixth MISFET being grounded.

2. A voltage booster circuit as claimed in claim 1, wherein the voltage at the source electrode of said first switching MISFET is used as the voltage source for said first complementary circuit and the output voltage of said voltage booster circuit is used as the voltage source for said second complementary circuit.

3. A voltage booster circuit as claimed in claim 1, wherein the channel conductivities of said third and fifth MISFETs are smaller than those of said fourth and sixth MISFETs.

4. A voltage booster circuit as claimed in claim 1, wherein said first, second, third and fifth MISFETs are of n-channel type and said fourth and sixth MISFETs are of p-channel type.

5. A voltage booster circuit as claimed in claim 1, wherein an input pulse signal T is applied through said first and second inverter circuits to the gate electrode of said fourth MISFET and the inversion T of said input pulse signal T is applied through said first inverter circuit to the gate electrode of said sixth MISFET.

* * * * *